(12) United States Patent
Kamei et al.

(10) Patent No.: US 9,519,694 B2
(45) Date of Patent: Dec. 13, 2016

(54) DEVICE FOR PRESENTING RECIPE AND METHOD FOR PRESENTING RECIPE

(71) Applicant: Panasonic Corporation, Osaka (JP)

(72) Inventors: Rinako Kamei, Osaka (JP); Norihiro Matsui, Osaka (JP); Takuya Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 14/114,231

(22) PCT Filed: Feb. 18, 2013

(86) PCT No.: PCT/JP2013/000865
§ 371 (c)(1),
(2) Date: Oct. 28, 2013

(87) PCT Pub. No.: WO2013/125201
PCT Pub. Date: Aug. 29, 2013

(65) Prior Publication Data
US 2014/0074830 A1 Mar. 13, 2014

(30) Foreign Application Priority Data
Feb. 21, 2012 (JP) ................. 2012-034733

(51) Int. Cl.
*G06F 17/30* (2006.01)
*G06Q 10/00* (2012.01)
*G06Q 50/00* (2012.01)

(52) U.S. Cl.
CPC ......... *G06F 17/30554* (2013.01); *G06Q 10/00* (2013.01); *G06Q 50/00* (2013.01)

(58) Field of Classification Search
CPC   G06F 17/30554; G06F 19/3481; G06F 3/048; G06Q 50/00; G06Q 10/00; G06Q 30/0601; G06Q 10/06; G06Q 50/12; G09B 5/00

(Continued)

(56) References Cited

U.S. PATENT DOCUMENTS 8,335,796 B2    12/2012  Maeda et al.
2003/0220916 A1*  11/2003  Imaichi ............ G06F 17/30716

(Continued)

FOREIGN PATENT DOCUMENTS

CN    101256594    9/2008
JP    2000-316492    11/2000

(Continued)

OTHER PUBLICATIONS

International Search Report issued Mar. 19, 2013 in International (PCT) Application No. PCT/JP2013/000865.

(Continued)

*Primary Examiner* — Evan Aspinwall
(74) *Attorney, Agent, or Firm* — Wenderoth, Lind & Ponack, L.L.P.

(57) ABSTRACT

A recipe presentation device includes: a recipe storage unit storing recipes each including preparation elements of ingredients, intermediate ingredients, and a dish to be served; a receiving unit which receives a dish specified by a user; a search unit which searches the recipe storage unit for a first recipe which is a recipe for the dish; a similarity calculation unit which calculates similarities between the individual recipes for the dishes stored in the recipe storage unit and the first recipe; a selection unit which selects, according to the similarities, a second recipe which is a recipe similar to the (Continued)

first recipe among the recipes for the dishes; and a presentation unit which presents a dish corresponding to the selected second recipe.

8 Claims, 16 Drawing Sheets

(58) Field of Classification Search
USPC .......................................................... 707/723
See application file for complete search history.

(56) References Cited

U.S. PATENT DOCUMENTS

| | | | |
|---|---|---|---|
| 2005/0160114 A1* | 7/2005 | Hunt ....................... | G06Q 10/10 |
| 2005/0192869 A1* | 9/2005 | Maeda ............... | G06Q 30/0601 |
| | | | 705/26.1 |
| 2013/0149676 A1* | 6/2013 | Tokuda .................. | G09B 19/00 |
| | | | 434/127 |

FOREIGN PATENT DOCUMENTS

| | | |
|---|---|---|
| JP | 2002-092120 | 3/2002 |
| JP | 4364795 | 11/2009 |
| WO | 03/107233 | 12/2003 |

OTHER PUBLICATIONS

Shihono Karikome, Atsushi Fuji, "Ryori Doshi no Ruiji to Kumiawase ni Motozuku Kanren Recipe Kensaku System", Proceedings of the Fourteenth Annual Meeting of the Associationfor Natural Language Processing, Mar. 17, 2008, pp. 959 to 962.

Masashi Iwakami, Takayuki Ito, "An Implementation of a Recipe Recommendation System with user's Preference Order", 2010 Nendo The Japanese Society for Artificial Intelligence Zenkoku Taikai (Dai 24 Kai) Ronbunshu [CD-ROM], Jun. 11, 2010, pp. 1 to 4.

Tomoya Nakamura et al., "Setai Tokusei to Sozai Tokusei o Koryo Shita Kaisoteki Menu Recommendation System", Operations Research as a Management Science Research, Feb. 1, 2010, vol. 55, No. 2, pp. 91 to 97.

Shihono Karikome, Atsushi Fujii, "Ryori Recipe no Kensaku to Eiyo Balance no Bunseki ni yoru Shokuseikatsu Shien System", The First Forum on Data Engineering and Information Management—DIEN Forum—Ronbunshu, May 9, 2009, pp. 1 to 5.

Office Action and Search Report issued Aug. 31, 2016 in Chinese Patent Application No. 201380001176.2, with English language Search Report.

* cited by examiner

FIG. 5A

| Step ID | b33 |
|---|---|
| Foodstuff | Croquette ingredients |
| Quantity | 640 g |
| Preparation | Mix |
| Preceding step ID | b32, b41 |
| Following step ID | b14 |

FIG. 5B

| Step ID | b15 |
|---|---|
| Foodstuff | Potato croquettes |
| Quantity | 750 g |
| Preparation | – |
| Preceding step ID | b14 |
| Following step ID | – |

FIG. 5C

| Step ID | b30 |
|---|---|
| Foodstuff | Potato |
| Quantity | 300 g |
| Preparation | – |
| Preceding step ID | – |
| Following step ID | b31 |

FIG. 8

Potato croquettes
Ingredients: potatoes, ground pork, eggs, flour
Preparation method: 1. Boil the potatoes. 2. Mash the boiled potatoes. 3. Stir-fry the ground pork. 4. Mix the mashed potatoes and stir-fried ground pork to make croquette filling. 5. Dredge patties of the croquette filling in flour, and then dip in beaten egg. 6. Fry the patties.

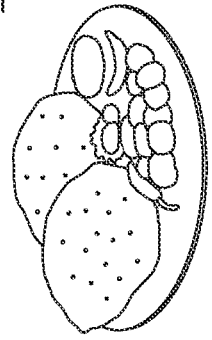

■ Recommendable recipes to cook along with potato croquettes

Creamy mashed potato
Ingredients: potatoes, milk
Preparation method: 1. Boil the potatoes. 2. Mash the potatoes. 3. ...

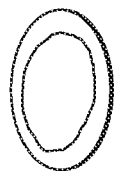

German omelette
Ingredients: bacon, potatoes, eggs
Preparation method: 1. Stir-fry the bacon. 2. Stir-fry the potatoes. 3. ...

FIG. 9

Potato croquettes
Ingredients: potatoes, ground pork, eggs, flour
Preparation method: 1. Boil the potatoes. 2. Mash the boiled potatoes. 3. Stir-fry the ground pork. 4. Mix the mashed potatoes and stir-fried ground pork to make croquette filling. 5. Dredge patties of the croquette filling in flour, and then dip in beaten egg. 6. Fry the patties.

■ Recommendable recipes to cook along with potato croquettes

German omelette
Ingredients: bacon, potatoes, eggs
Preparation method: 1. Stir-fry the bacon. 2. Stir-fry the potatoes. 3. …

Creamy mashed potato
Ingredients: potatoes, milk
Preparation method: 1. Boil the potatoes. 2. Mash the potatoes. 3. …

FIG. 10

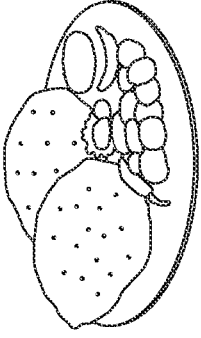

Potato croquettes
Ingredients: potatoes, ground pork, eggs, flour
Preparation method: 1. Boil the potatoes. 2. Mash the boiled potatoes. 3. Stir-fry the ground pork. 4. Mix the mashed potatoes and stir-fried ground pork to make croquette filling. 5. Dredge patties of the croquette filling in flour, and then dip in beaten egg. 6. Fry the patties.

■ Recipes including more steps in common

Creamy mashed potato
Ingredients: potatoes, milk
Preparation method: 1. Boil the potatoes. 2. Mash the potatoes. 3. ...

Potato salad
Ingredients: potatoes, carrots, onions
Preparation method: 1. Boil the potatoes. 2. Boil the carrots. ...

■ Recipes including more ingredients in common

German omelette
Ingredients: bacon, potatoes, eggs
Preparation method: 1. Stir-fry the bacon. 2. Stir-fry the potatoes.

Hearty soup
Ingredients: potatoes, ground pork, carrots, green peas
Preparation method: 1. Cut up potatoes. 2. ...

DEVICE FOR PRESENTING RECIPE AND METHOD FOR PRESENTING RECIPE

TECHNICAL FIELD

The present invention relates to a device for presenting recipes and a method for presenting recipes.

BACKGROUND ART

There has been a disclosed technique for inferring recommendable preparable dishes from food-in-stock information managed by a system or from foodstuff information entered by a user who plans a daily menu with reference to recipe information, and presenting the dishes to the user (see Patent Literature (PTL 1)).

Furthermore, there has been a disclosed technique which enables partial-match searching of recipe information using an ingredient or a preparation method as a searching key (see PTL 2).

CITATION LIST

Patent Literature

[PTL 1] Japanese Unexamined Patent Application Publication No. 2002-92120
[PTL 2] International Publication No. 2003/107233

SUMMARY OF INVENTION

Technical Problem

However, it is difficult for a user who wants to prepare dishes from similar recipes to identify dishes preparable according to similar recipes.

In view of this, the present invention provides a device and others for presenting, in a manner easily understandable to users, dishes preparable according to similar recipes.

Solution to Problem

A recipe presentation device according to one aspect of the present invention includes: a recipe storage unit storing recipes for dishes, the recipes each including preparation elements of (i) ingredients which are materials for a corresponding one of the dishes, (ii) intermediate ingredients which are processed from the ingredients and to be further processed before completion of the corresponding dish, and (iii) a dish which indicates the corresponding dish as a dish to be served; a receiving unit configured to receive input for specifying a dish from a user; a search unit configured to search the recipe storage unit for a first recipe which is a recipe for the dish specified in the input received by the receiving unit; a similarity calculation unit configured to calculate a similarity between each of the recipes for the dishes stored in the recipe storage unit and the first recipe retrieved by the search unit; a selection unit configured to select, according to a plurality of the similarities calculated by the similarity calculation unit, a second recipe which is a recipe similar to the first recipe among the recipes for the dishes; and a presentation unit configured to present a dish corresponding to the second recipe selected by the selection unit.

Each general or specific aspect of the present invention may be implemented using a system, a method, an integrated circuit, a computer program, or a computer-readable recording medium such as a CD-ROM, or any combination of a system, a method, an integrated circuit, a computer program, and a recording medium.

Advantageous Effects of Invention

The recipe presentation device according to the present invention is capable of presenting a dish preparable according to a recipe similar to a recipe for a dish specified by a user.

BRIEF DESCRIPTION OF DRAWINGS

FIG. 5A shows an example of a preparation element (intermediate ingredient) in the recipe presentation device according to Embodiment 1.

FIG. 5B shows an example of a preparation element (dish to be served) in the recipe presentation device according to Embodiment 1.

FIG. 5C shows an example of a preparation element (ingredient) in the recipe presentation device according to Embodiment 1.

FIG. 8 shows exemplary recipes to be presented by the recipe presentation device according to Embodiment 1.

FIG. 9 shows other exemplary recipes to be presented by the recipe presentation device according to Embodiment 1.

FIG. 10 shows other exemplary recipes to be presented by the recipe presentation device according to Embodiment 1.

DESCRIPTION OF EMBODIMENTS (Underlying Knowledge Forming Basis of the Present Invention)

The inventors have found the following problem with the recipe presentation device mentioned in a foregoing section, "Background Art".

Conventionally, planning daily menus for family meals has been a burden to those who prepare the meals, such as homemakers, with or without interest in cooking. In particular, when a member of a family is an infant who needs to be fed with baby food, a person allergic to a specific food, or a person having a food restriction, it is necessary for a homemaker of the family not only to plan a special dish for the member but also to get all ingredients necessary for dishes for all members and prepare the special dish separately from but in parallel with a dish for the other member efficiently.

Today cooking information including ingredients and quantity, preparation methods, utensils to use, cooking time, and nutrition values are available as a lot of recipes on cookbooks, cooking shows, and websites on the Internet.

A lot of users refer to the recipe information to plan daily menus. For example, there has been a disclosed technique for inferring preparable dishes from food-in-stock information managed by a system or from foodstuff information entered by a user and presenting the dishes to the user who plans a daily menu with reference to recipe information (see Patent Literature (PTL 1)).

Furthermore, there has been a disclosed technique which enables partial-match searching of recipe information by an ingredient or a preparation method therein (see PTL 2).

Figure 12:
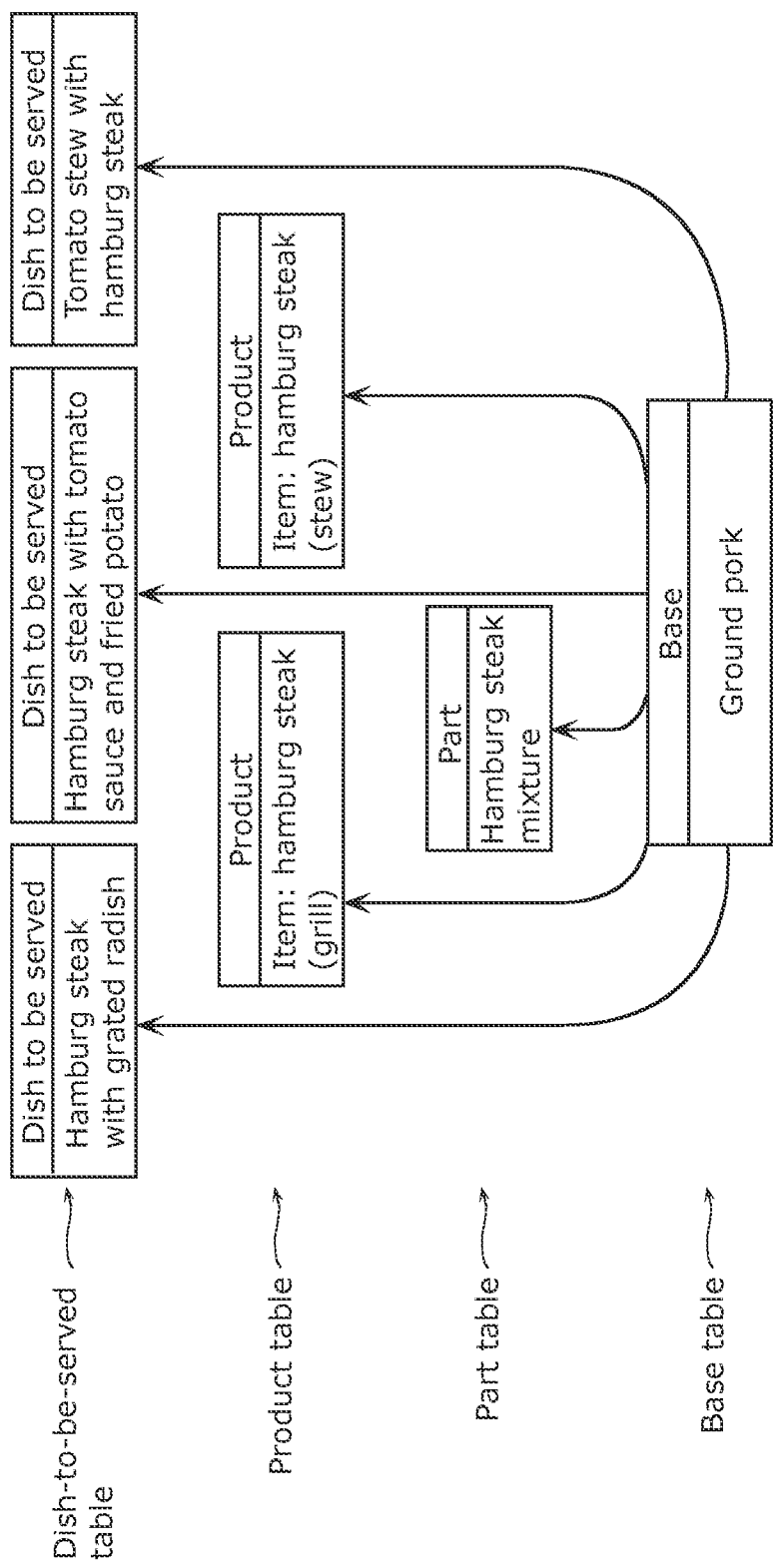
FIG. 12 shows an example of a recipe DB for use in an assumed technique.

FIG. 12 shows an example of a recipe DB for use in a technique assumed to be equivalent to a technique disclosed in PTL 2. The recipe DB in FIG. 12 is an example of a database in which recipes are broken down into data elements such as an ingredient and a preparation step and stored by the data elements. The recipe DB includes four databases of a dish-to-be-served DB, a product DB, a part DB, and a base DB which compose a recipe. The four databases are each a data record of a target step among chronological steps in a recipe. The data is recorded in a "base table", a "part table", a "product table", and a "dish-to-be-served table" in a corresponding manner. The data in each of the tables corresponds to a preparation element. The data of "base" includes at least one of an ingredient (for example, a vegetable, a meat, or a spice) or a utensil to be used for processing the ingredient. The data "part" includes at least one of processed "base" (for example, a chopped vegetable, a pre-seasoned fish or a pre-seasoned meat) or a utensil to be used for the preparation. The data "product" includes at least one of combined or processed "parts" or a utensil to be used for the combining or the processing. More specifically, the data "product" includes an object of boiling, grilling, steaming, deep-frying, or stir-frying or an event thereof, such as a grilled hamburg steak or a frying pan. Ingredients to be used for the "product" without being subjected to a process (for example, a spice) are included in the data of "part". Thus, ingredients such as spices may be recorded as "base" and as "part" as well. The data "dish-to-be-served" includes at least one of a dish to be served, a plate or a bowl where the dish to be served is put, or a way of the serving (for example, serving on a plate, dressing with a sauce, or adding something as a garnish).

However, it is difficult for a user who wants to prepare several dishes from similar recipes to identify such dishes preparable according to similar recipes. In a conventional method of identifying such dishes, a user searches for a dish similar to a certain dish using a keyword of the user's own choice, or the user by itself judges and selects a similar dish from a result of such searching by comparing ingredients and preparation methods of the dishes in the result. In these methods, the user needs to choose an appropriate keyword to find an appropriate dish. Furthermore, when the user makes an inappropriate judgment, the user cannot find a plurality of dishes preparable according to similar recipes. This will increase time and trouble taken to cook a meal.

This problem occurs especially when a conventional recipe DB as disclosed in PTL 2 is used. More specifically, this is because the conventional recipe DB is not made for presentation of plurality of dishes preparable according to similar recipes.

In view of this, the present invention provides a device and a method each for presenting dishes preparable according to similar recipes in a manner easily understandable to users.

In order to solve the problem, provided is a recipe presentation device according to an aspect of the present invention which includes: a recipe storage unit storing recipes for dishes, the recipes each including preparation elements of (i) ingredients which are materials for a corresponding one of the dishes, (ii) intermediate ingredients which are processed from the ingredients and to be further processed before completion of the corresponding dish, and (iii) a dish which indicates the corresponding dish as a dish to be served; a receiving unit configured to receive input for specifying a dish from a user; a search unit configured to search the recipe storage unit for a first recipe which is a recipe for the dish specified in the input received by the receiving unit; a similarity calculation unit configured to calculate a similarity between each of the recipes for the dishes stored in the recipe storage unit and the first recipe retrieved by the search unit; a selection unit configured to select, according to a plurality of the similarities calculated by the similarity calculation unit, a second recipe which is a recipe similar to the first recipe among the recipes for the dishes; and a presentation unit configured to present a dish corresponding to the second recipe selected by the selection unit.

As described above, the recipe presentation device according to an aspect of the present invention presents a dish preparable according to a recipe having an ingredient and a preparation element in common with a dish specified by a user from dishes stored in the recipe storage unit. Thus, with reference to the dish presented by the recipe presentation device, the user can learn a plurality of dishes preparable according to similar recipes without performing keyword search or comparing retrieved information. The recipe presentation device thus presents dishes preparable according to similar recipes, in a manner easily understandable to users.

For example, the search unit is configured to search the recipe storage unit for a first ingredient which is a set of ingredients for the dish specified in the input received by the receiving unit, the similarity calculation unit is configured to calculate a similarity between a set of the ingredients included in each of the recipes stored in the recipe storage unit and the first ingredient retrieved by the search unit, the selection unit is configured to select, according to a plurality of the similarities calculated by the similarity calculation unit, a second ingredient which is one or more ingredients in a plurality of the sets of the ingredients included in the individual recipes and also included in the first ingredient, and the presentation unit is configured to present a dish corresponding to the second ingredient selected by the selection unit.

This recipe presentation device presents a dish preparable according to a recipe having an ingredient in common with a dish specified by a user. Thus, with reference to the dishes presented by the recipe presentation device, the user can learn a plurality of dishes preparable according to recipes including a common ingredient.

For example, the similarity calculation unit is configured to calculate the similarity between the first recipe and each of the recipes for the dishes by obtaining a weighted sum of an ingredient similarity and a process similarity, the ingredient similarity indicating a total number of common ingredients between the first recipe and the recipe for the dish, and the process similarity indicating a total number of common intermediate ingredients between the first recipe and the recipe for the dish.

For example, the similarity calculation unit is configured to calculate the similarity between the first recipe and each of the recipes for the dishes by obtaining the weighted sum of the ingredient similarity and the process similarity using weightings which add up to 1 and each have a value not less than 0 and not greater than 1.

Furthermore, the recipe presentation device is arbitrarily configurable to present a dish preparable according to a recipe having an ingredient in common with a dish specified by a user, present a dish preparable according to a recipe having a preparation element in common with a dish specified by a user, or to present a dish preparable according to a recipe having both ingredients and preparation elements in common with a dish specified by a user.

For example, the presentation unit is configured to present the dish corresponding to the second recipe selected by the selection unit, by displaying a name of the dish corresponding to the second recipe closer to a name of the dish corresponding to the first recipe when a similarity between the second recipe and the first recipe is higher.

This recipe presentation device is capable of presenting dishes preparable according to recipes having ingredients or a preparation element in common with a dish specified by a user, in a manner that allows the user to see the dishes at a glance.

For example, the presentation unit is configured to present the dish corresponding to the second recipe and the similarity between the second recipe and the first recipe using a dish similarity map which is a two-dimensional plane on which the dish corresponding to the first recipe and the dish corresponding to the second recipe plotted, the two-dimensional plane having an axis indicating the ingredient similarity and an axis indicating the process similarity.

This recipe presentation device according to an aspect of the present invention presents a user with a dish having an ingredient in common with a dish specified by a user, a dish having a preparation element in common with the dish specified by the user, and a dish having an ingredient and a preparation element in common with the dish specified by the user along with the similarities between the dishes and the dish specified by the user, all of which are plotted on a similarity map. The user is allowed to select a dish to prepare in parallel with the dish specified by the user, from among the candidate dishes plotted on the similarity map. Thus, with reference to the dishes presented by the recipe presentation device, the user can learn a plurality of dishes preparable according to similar recipes without performing keyword search or comparing retrieved information.

General and specific aspects of the present invention may be implemented using a system, a method, an integrated circuit, a computer program, or a computer-readable recording medium such as a CD-ROM, or any combination of a system, a method, an integrated circuit, a computer program, and a recording medium.

Embodiments will be described below with reference to drawings.

Note that the embodiments described below each shows a general or specific example. The values, materials, constituent elements, layout and connection of the constituent elements, steps, and the order of the steps in the embodiments are given not for limiting the present invention but merely for illustrative purposes only. Therefore, among the constituent elements in the following exemplary embodiments, constituent elements not recited in any one of the independent claims are described as optional constituent elements.

The same constituent elements are denoted with the same reference signs, and the description thereof may be omitted.

[Embodiment 1]

Figure 1:
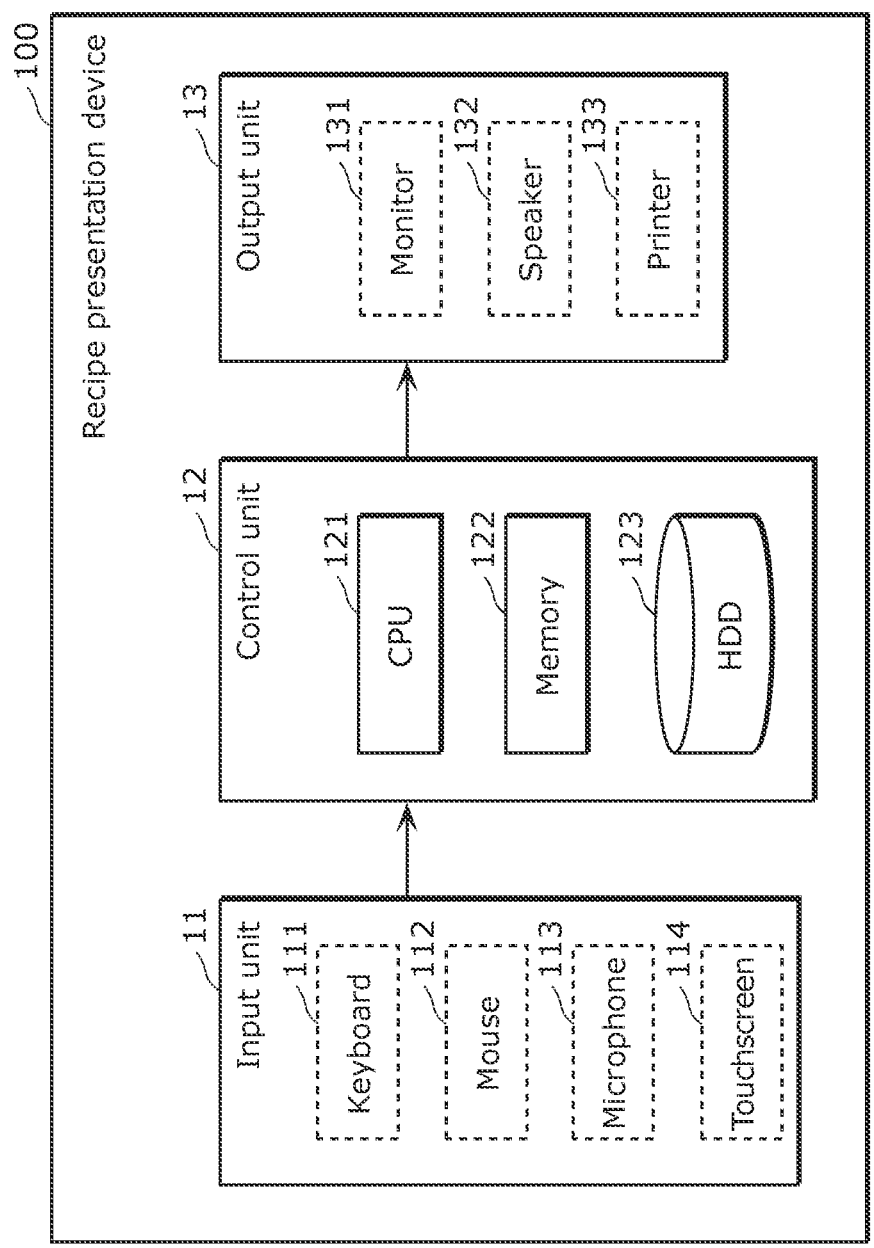
FIG. 1 shows an exemplary hardware configuration of a recipe presentation device according to Embodiment 1.

FIG. 1 shows an exemplary hardware configuration of a recipe presentation device 100 according to Embodiment 1.

As shown in FIG. 1, the recipe presentation device 100 according to Embodiment 1 includes an input unit 11, a control unit 12, and an output unit 13.

The block of the input unit 11 represents hardware which receives input from a user. Specific examples of the input unit 11 include a keyboard 111 which receives input using characters and symbols, a mouse 112 which receives input using a pointer, a microphone 113 which receives speech input, and a touchscreen 114 which receives touch input on the touchscreen. The input unit 11 includes at least one of them. Note that the input unit 11 may be any other piece of hardware which can receive input from a user.

The block of the control unit 12 represents hardware which executes a control program of the recipe presentation device 100 according to Embodiment 1 upon receiving input from the input unit 11. For example, the control unit 12 includes a central processing unit (CPU) which is a processor to execute the control program, memory 122 which is a work area for execution of the control program, and a hard disk drive (HDD) 123 storing the control program.

The block of the output unit 13 represents hardware which outputs results of the control program from the control unit 12 in a manner intelligible to the user. Specific examples of the output unit 13 include a monitor which outputs such results in the form of screen images including characters, symbols, and pictures, a speaker 132 which outputs such results in the form of sound, and a printer 133 which outputs such results in the form of printed matters including characters, symbols, and pictures. The output unit 13 includes at least one of them. Note that the output unit 13 may be any other piece of hardware which can output results of the control program in a manner intelligible to the user.

Figure 2:
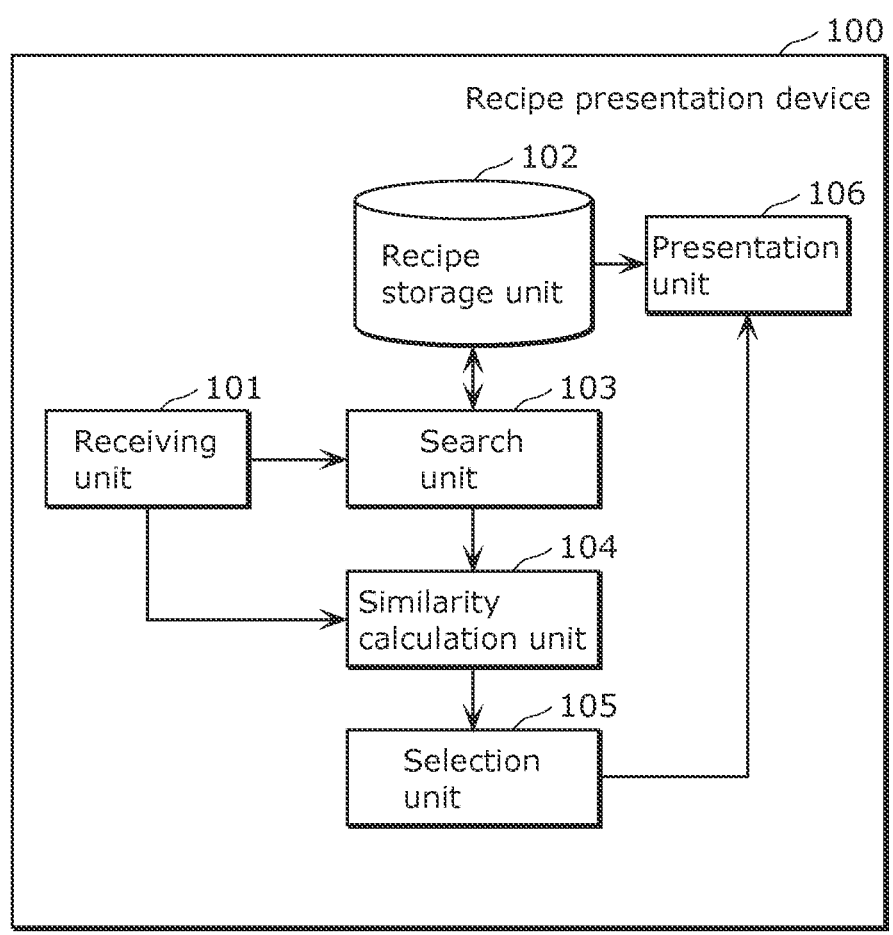
FIG. 2 shows an exemplary functional block configuration of the recipe presentation device according to Embodiment 1.

FIG. 2 shows an exemplary functional block configuration of the recipe presentation device 100 according to Embodiment 1.

As shown in FIG. 2, the recipe presentation device 100 according to Embodiment 1 of the present invention includes: a receiving unit 101, a recipe storage unit 102, a search unit 103, a similarity calculation unit 104, a selection unit 105, and a presentation unit 106.

The receiving unit 101 represents a function to be implemented by the input unit 11 in FIG. 1. The receiving unit 101 receives input for specifying a dish from a user. Examples of such input for specifying a dish include input of a dish as a text and input for specifying a dish from a list of dishes presented to a user.

The recipe storage unit 102 represents a function to be implemented by the control unit 12 in FIG. 1. In the recipe storage unit 102, recipes for dishes are stored as a hierarchy of preparation elements of (i) ingredients which are materials for each of the dishes, (ii) intermediate ingredients of the dish, and (iii) dishes which are each a dish to be served.

The search unit 103 represents a function to be implemented by the control unit 12 in FIG. 1. The search unit 103 searches the recipe storage unit for preparation elements of a recipe for a dish specified in the input received by the receiving unit 101.

The similarity calculation unit 104 represents a function to be implemented by the control unit 12 in FIG. 1. The similarity calculation unit 104 calculates a similarity between a recipe for a dish specified in the input received by the receiving unit 101 and all or part of the recipes for the dishes stored in the recipe storage unit 102.

The selection unit 105 represents a function to be implemented by the control unit 12 in FIG. 1. The selection unit 105 selects dishes to be output from among dishes, according to similarities between recipes calculated by the similarity calculation unit 104.

The presentation unit 106 represents a function to be implemented by the output unit 13 in FIG. 1. The presentation unit 106 outputs dishes selected by the selection unit 105.

Figure 3A:
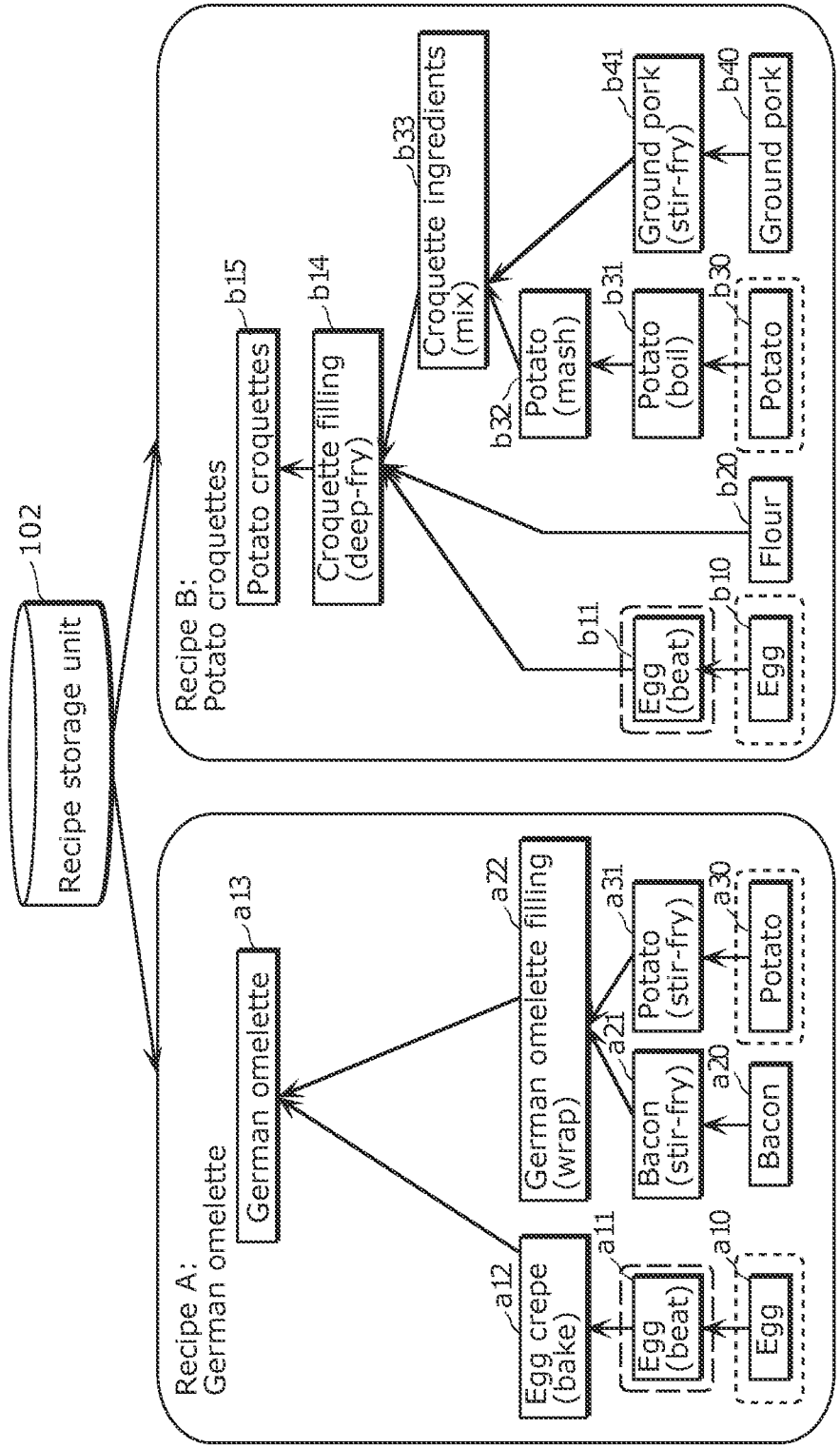
FIG. 3A shows examples of recipes in the recipe presentation device according to Embodiment 1.
Figure 3B:
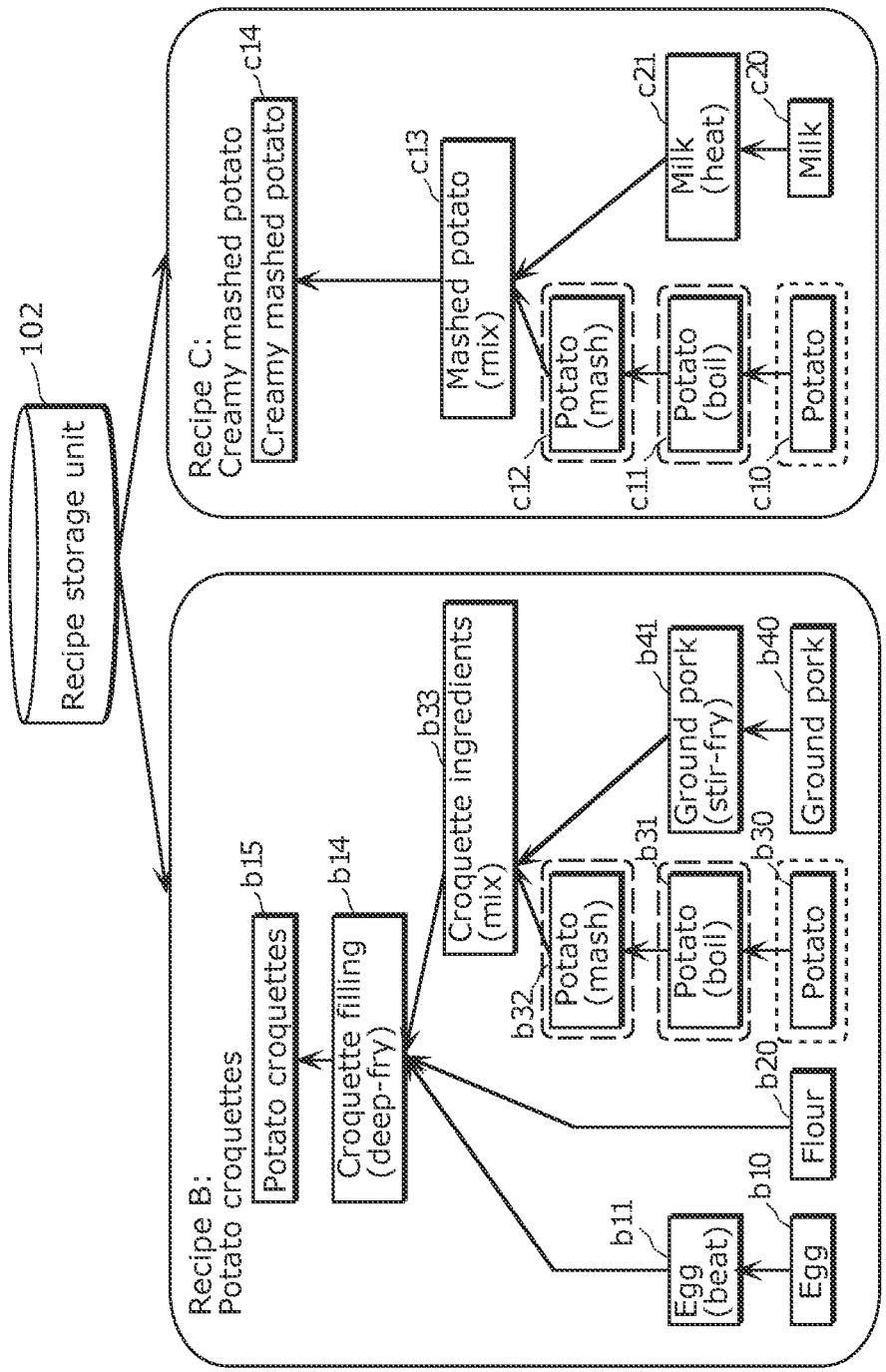
FIG. 3B shows other examples of recipes in the recipe presentation device according to Embodiment 1.

FIG. 3A and FIG. 3B each show examples of recipes in the recipe presentation device 100 according to Embodiment 1. FIG. 3A and FIG. 3B show a recipe A for "German omelette", a recipe B for "potato croquettes", and a recipe C for "creamy mashed potato" stored in the recipe storage unit 102. In FIG. 3A and FIG. 3B, preparation elements at further advanced stages in each preparation process are positioned higher in the diagrams.

Figure 4A:
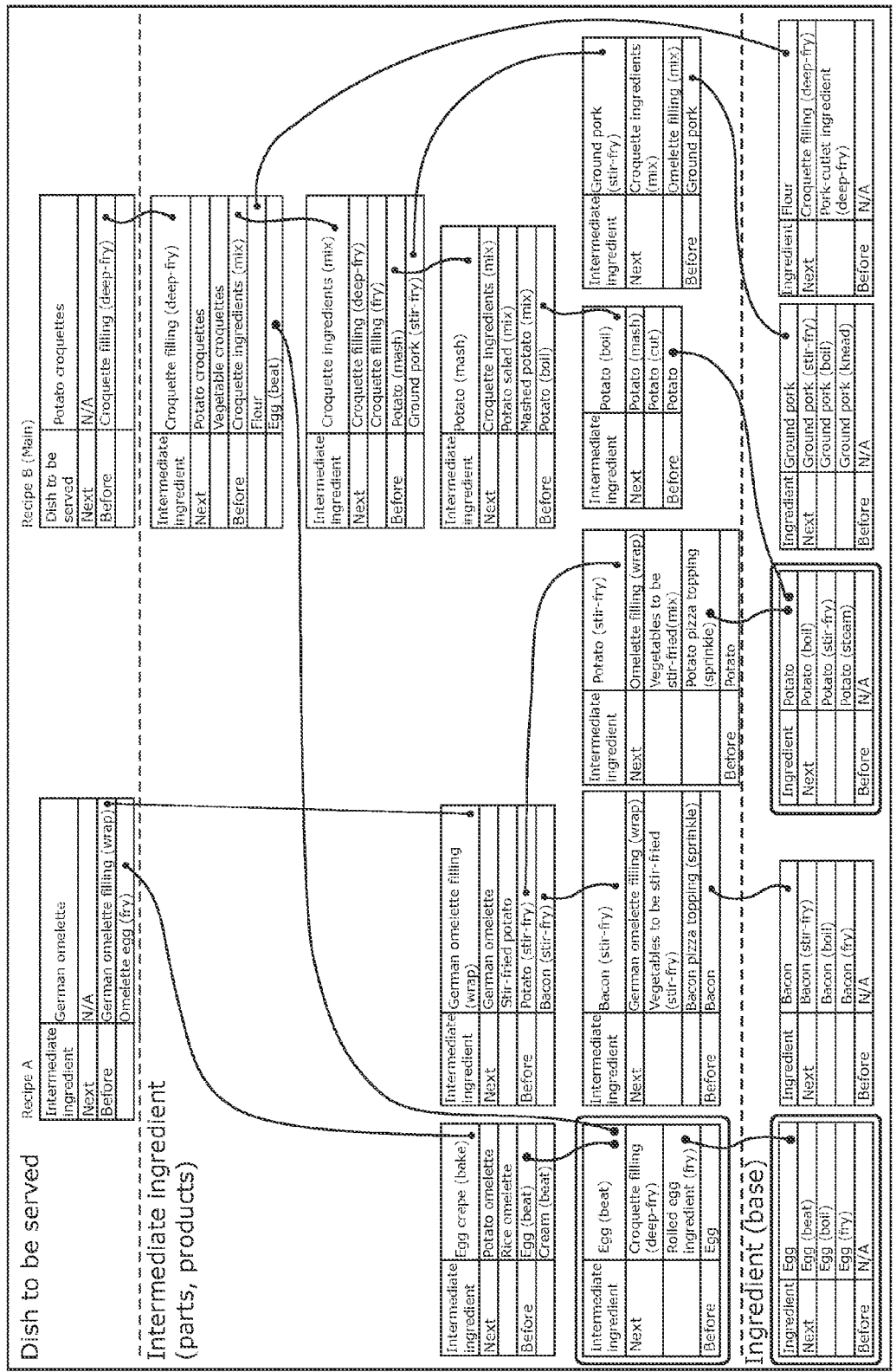
FIG. 4A shows exemplary recipes in the recipe presentation device according to Embodiment 1 in detail.
Figure 4B:
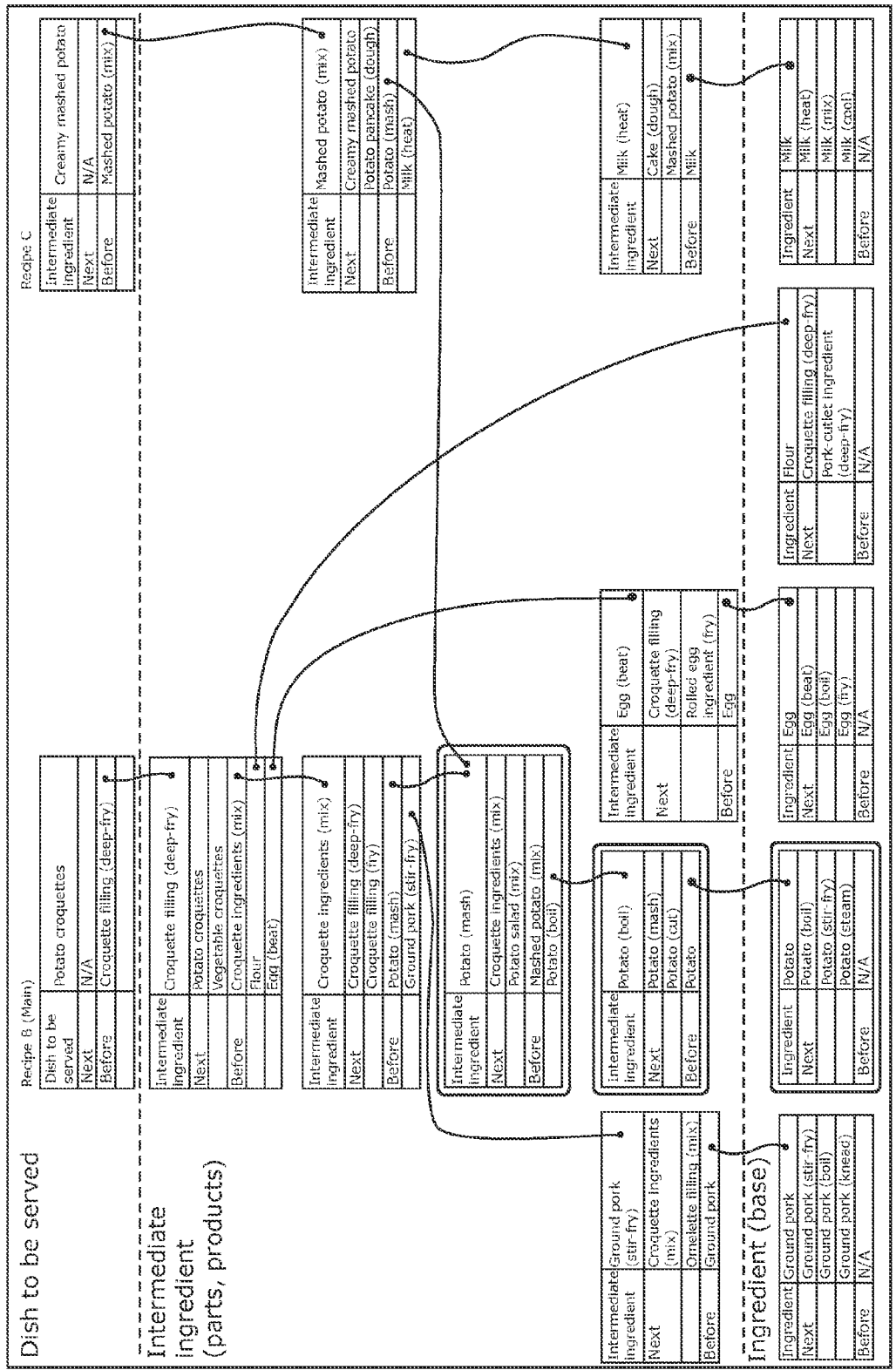
FIG. 4B shows other exemplary recipes in the recipe presentation device according to Embodiment 1 in detail.

The preparation elements in the recipe presentation device 100 according to Embodiment 1 are shown in detail in FIG. 4A and FIG. 4B. Each preparation element includes fields for the following items: a foodstuff which is an object of process, a preceding preparation element (Before), and a following preparation element (Next). Each line connecting preparation elements indicates that performing of the preparation element at one end of the line is followed by performing of the preparation element at the other end of the line.

FIG. 5A, FIG. 5B, and FIG. 5C are examples of data items included in preparation elements according to Embodiment 1. In each of FIG. 5A, FIG. 5B, and FIG. 5C, an item of "Step 1D" represents an ID for unique identification of the preparation element. The item "Foodstuff" represents a foodstuff which is an object of process in the current preparation element. The item "Quantity" represents the quantity of a foodstuff which is an object of the process in the current preparation element. The item "Preparation" is what to be performed as a process on the foodstuff in the current preparation element. The item "Preceding step ID" is a step ID of a preparation element through which an ingredient for the foodstuff of the current preparation element is generated (that is, a preparation element through which an ingredient for the foodstuff is prepared). The item "Following step ID" is a step ID of a preparation element to be performed next on what is generated through the current preparation element.

FIG. 5A is a data structure diagram of a preparation element b33 in FIG. 3A. The preparation element b33 shown in FIG. 5A indicates "to mix 640 g of croquette filling". Potatoes and around pork as ingredients of the croquette filling, which is the foodstuff of the current preparation element, are generated in a preparation element b32 and a preparation element b41, respectively. The preparation element to be performed on the croquette filling generated through the current preparation element is a preparation element b14. Preparation elements having values for all of the items of Preparation, Preceding step ID, and Following step ID are referred to as preparation elements of "Intermediate ingredient".

FIG. 5B is a data structure diagram of a preparation element b15 in FIG. 3A. The preparation element b15 indicates a dish to be served, and thus has no values for the item of Preparation or Following step ID. Preparation elements having no values for the item of Preparation or Following step ID are referred to as preparation elements of "Dish".

FIG. 5C is a data structure diagram of a preparation element b30 in FIG. 3A. The preparation element b30 indicates an initial ingredient to be processed, and thus has no value for the item of Preparation or Preceding step ID. Preparation elements having no value for the item of Preparation or Preceding step ID are referred to as preparation elements of "Ingredient". Examples of recipes are shown as a recipe DB in FIG. 12.

Figure 6:
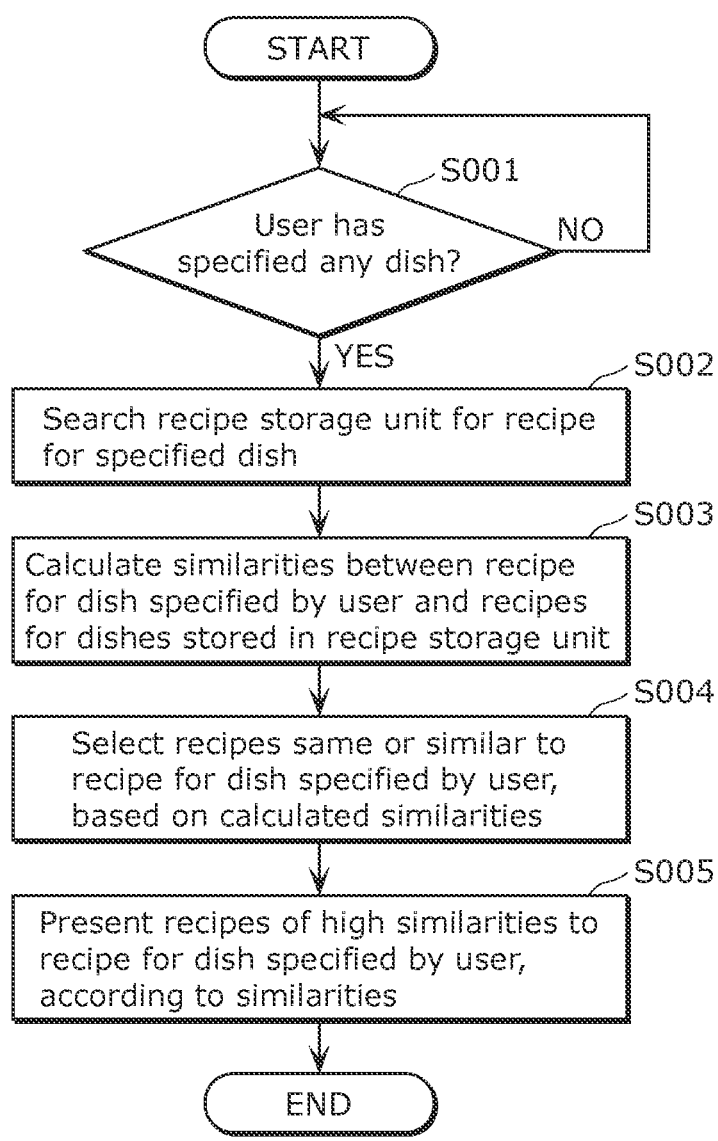
FIG. 6 is a flowchart showing processing to be performed by the recipe presentation device according to Embodiment 1.

FIG. 6 is a flowchart showing an outline of the processing to be performed by the recipe presentation device 100 according to Embodiment 1. The recipe presentation device 100 performs a sequence of steps shown in FIG. 6 to calculate similarity between recipes for dishes stored in the recipe storage unit 102 and a recipe for a dish selected by a user, and to present dishes in descending order of the similarity between recipes. The following describes a case as a specific example in which the recipe storage unit 102 stores a recipe A for "potato croquettes", a recipe B for "mashed potato with egg", and a recipe C for "creamy mashed potato", and a user specifies the recipe A for "potato croquettes".

As shown in FIG. 6, first, the recipe presentation device 100 according to Embodiment 1 receives input from a user through the receiving unit 101, and then determines whether or not the user has specified any dish (Step S001). When it is determined that the user has not specified any dish, the recipe presentation device 100 receives other input from the user (Step S100, NO).

When the user has specified any dish (Step S001, YES), the recipe presentation device 100 searches the recipe storage unit 102 for preparation elements included in the recipe for the specified dish (Step S002). For example, when the receiving unit 101 receives input to specify a dish of "potato croquettes" which corresponds to the recipe B for potato croquettes in FIG. 3A, the search unit 103 retrieves preparation elements b10, b11, b14, b15, b20, b30, b31, b32, b33, b40, and b41 from the recipe storage unit 102.

Next, similarities between the recipe for the specified dish and recipes for other dishes stored in the recipe storage unit 102 are calculated (Step S003). The similarity calculation unit 104 calculates a similarity between a recipe X and a recipe Y using (Equation 1).

Similarity between the recipe $X$ and the recipe $Y$=(total number of preparation elements of "Intermediate ingredient" having common values between the recipes for all the items of "Foodstuff", "Preparation", and "Preceding step ID")$\times w_1$+(total number of preparation elements of "Ingredient" having common values between the recipes for the item of "Foodstuff")$\times w_2$  (Equation 1)

Here, $w_1$ and $w_2$ have values preset to satisfy $w_1+w_2=1.0$. The values may be fixed values preset in the recipe presentation device 100 or may be changed by a user. For example, when $w_1$ and $w_2$ have values to satisfy $w_1>w_2$, the similarity between recipes increases as the recipes have more preparation elements in which a common ingredient is processed in the same manner. In contrast, when $w_1$ and $w_2$ have values to satisfy $w_1<w_2$, the similarity between recipes increases as the recipes have more ingredients in common.

The first term in the right side of (Equation 1) is referred to a term of as process similarity, and the second term in the right side of (Equation 1) is referred to as a term of ingredient similarity.

Next, the calculated similarities between the recipes are used to select dishes similar to the specified dish (S004), and the selected dishes are presented to the user in descending order of the similarities between the recipes (Step S005). The following details Steps S002 to S005 in the case where the recipe B is specified in Step S001.

Figure 7:
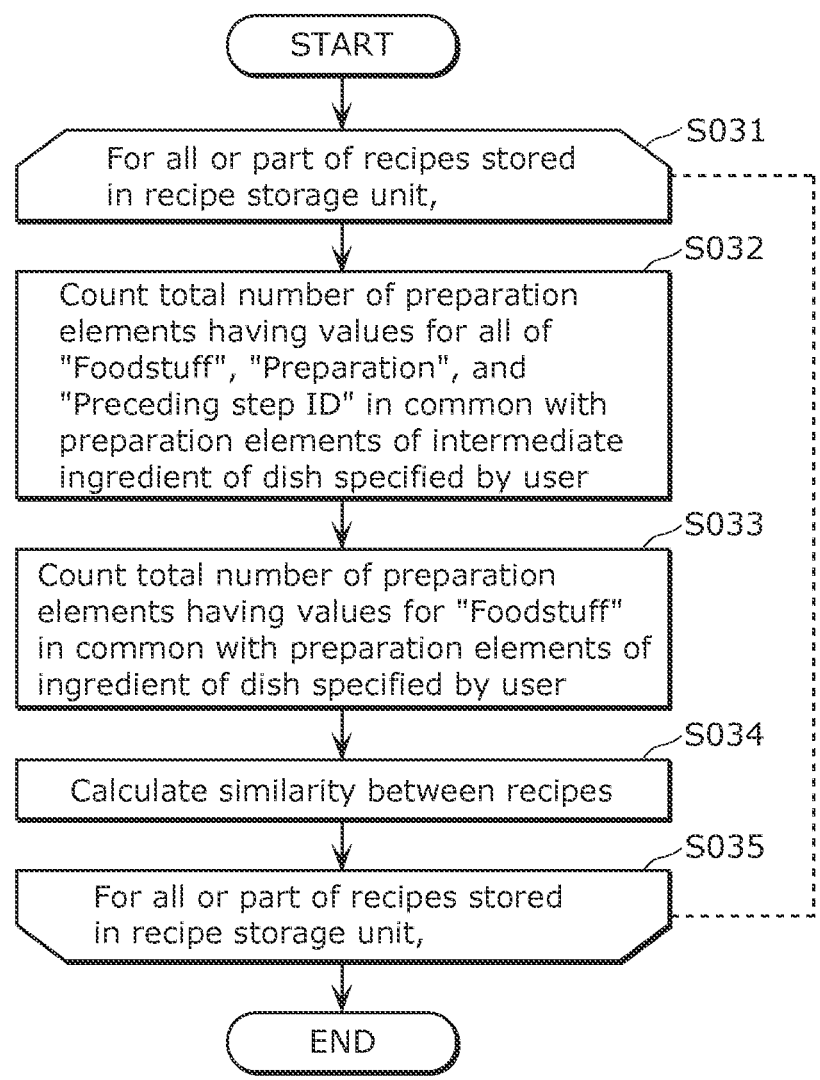
FIG. 7 is a flowchart showing processing to be performed by a similarity calculation unit of the recipe presentation device according to Embodiment 1.

FIG. 7 is a flowchart showing processing to be performed by the similarity calculation unit 104 of the recipe presentation device 100 according to Embodiment 1. This illustrates the processing performed in Step S003 in FIG. 6. Assume, as an example, that a value of 0.7 for $w_1$ and a value of 0.3 for $w_2$ are preset in the similarity calculation unit 104.

As shown in FIG. 7, first, the similarity calculation unit 104 performs the processing (from Steps S031 to Step S035) on all or part of recipes stored in the recipe storage unit 102 (in Embodiment 1, the recipe B and recipe C).

First, focusing on the recipe A, the similarity calculation unit 104 counts the total number of preparation elements having values for all the items of "Foodstuff", "Preparation", and "Preceding step ID" in common with any of the preparation elements of "Intermediate ingredient" of the recipe B (b11, b31, b41, b32, b33, and b14 in FIG. 3A). Among the preparation elements of the recipe A shown in FIG. 3A, a preparation element a11 have values for all the items of "Foodstuff", "Preparation", and "Preceding step ID" in common with one of the preparation elements of "Intermediate ingredient" of the recipe B. Thus, the total number is one (Step S032). Next, the similarity calculation unit 104 counts the total number of preparation elements of the recipe A which have a value for the item of "Foodstuff" in common with any of the preparation elements of "Ingredient" of the recipe B (b10, b20, b30, and b40 in FIG. 3A). Among the preparation elements of the recipe A shown in FIG. 3A, preparation elements a10 and a30 each have a value for the item of "Foodstuff" in common with one of the preparation elements of "Ingredient" of the recipe B. Thus, the total number is two (Step S033). Next, the similarity calculation unit 104 calculates a similarity between the recipe A and the recipe B using (Equation 1). In Embodiment 1 where a value of 0.7 for $w_1$ and a value of 0.3 for $w_2$ are preset, the similarity between the recipe A and the recipe B is 1.3 (Step S034).

Next, focusing on the recipe C, the similarity calculation unit 104 counts the total number of preparation elements having values for all the items of "Foodstuff", "Preparation", and "Preceding step ID" in common with any of the preparation elements of "Intermediate ingredient" of the recipe B (b11, b31, b41, b32, b33, and b14 in FIG. 3B). Among the preparation elements of the recipe C shown in FIG. 4, preparation elements c11 and c12 each have values for all the items of "Foodstuff", "Preparation", and "Preceding step ID" in common with one of the preparation elements of "Intermediate ingredient" of the recipe B. Thus, the total number is two (Step S032). Next, the similarity calculation unit 104 counts the total number of preparation elements of the recipe B which have a value for the item of "Foodstuff" in common with any of the preparation elements of "Ingredient" of the recipe B (b10, b20, b30, and b40 in FIG. 3B). Among the preparation elements of the recipe C shown in FIG. 3A, a preparation element c10 has a value for the item "Foodstuff" in common with one of the preparation elements of "Ingredient" of the recipe B. Thus, the total number is one (Step S033). Next, the similarity calculation unit 104 calculates a similarity between the recipe B and the recipe C using (Equation 1). In Embodiment 1 where a value of 0.7 for $w_1$ and a value of 0.3 for $w_2$ are preset, the similarity between the recipe B and the recipe C is 1.7 (Step S034).

Next, the selection unit 105 outputs recipes according to the similarities between recipes thus calculated. FIG. 8 shows exemplary recipes to be presented by the recipe presentation device 100 according to Embodiment 1. In FIG. 8, the recipe B for "potato croquettes" specified by a user and the recipe C for "creamy mashed potato" having a higher similarity to the recipe B are presented in preference to the recipe A for "German omelette". Such presentation allows a user to select, without making a search, a candidate recipe for a dish which can be efficiently prepared in parallel with the dish of the recipe B.

Such a recipe having a higher similarity to a recipe for a dish specified by a user may be presented in another manner that allows the user to recognize that the recipe has a higher similarity to the recipe for the dish specified by the user. More specifically, a recipe having a higher similarity may be positioned closer to the recipe for the dish specified by a user. Optionally, a recipe having a higher similarity may be displayed in larger characters. Optionally, a recipe having a higher similarity may be displayed in a color different from other recipes.

When recipes are read out, a recipe a having higher similarity may be reproduced more loudly than other recipes.

FIG. 9 shows exemplary recipe presentation where a value of 0.7 for $w_1$ and a value of 0.3 for $w_2$ are preset in the similarity calculation unit 104. In the case where $w_1=0.3$ and $w_2=0.7$, the similarity between the recipe A and the recipe B is 1.7, and the similarity between the recipe B and the recipe C is 1.3. Thus, the recipe A for "German omelette", which has more ingredients in common with the recipe B for "potato croquettes" specified by a user, is presented above the recipe C for "creamy mashed potato".

FIG. 10 shows exemplary recipe presentation where the similarity calculation unit 104 has calculated similarities to the recipe B using a value of 1.0 for $w_1$ and a value of 0.0 for $w_2$ and similarities to the recipe B using a value of 0.0 for $w_1$ and a value of 1.0 for $w_2$. Recipes output according to the similarities for the value of 1.0 for $w_1$ and the value of 0.0 for $w_2$ are displayed on the left side of the display screen, and recipes output according to the similarities for the value of 0.0 for $w_1$ and the value of 1.0 for $w_2$ are displayed on the right side of the display screen. This presentation allows a user to see at a glance both a candidate dish preparable according to a recipe most similar to the recipe B in preparation methods and a candidate dish preparable according to a recipe most similar to the recipe B in ingredients. This way of presentation is beneficial when a user is yet to decide whether to prepare a meal according to a recipe having a preparation method as similar as possible to the preparation method of the recipe B or to prepare a meal according to a recipe having ingredients as similar as possible to the ingredients of the recipe B.

As described above, the recipe presentation device according to an aspect of the present invention selects and presents, from among dishes stored in the recipe storage unit, a dish preparable according to a recipe having ingredients and preparation elements in common with a dish specified by a user. Thus, with reference to the dishes presented by the recipe presentation device, a user can learn a plurality of dishes preparable according to similar recipes without performing keyword search or comparing retrieved information.

Furthermore, the recipe presentation device presents a dish preparable according to a recipe having one or more ingredients in common with a dish specified by a user. Thus, with reference to the dishes presented by the recipe presentation device, the user can learn a plurality of dishes preparable according to recipes including one or more common ingredients.

Furthermore, the recipe presentation device is arbitrarily configurable to present a dish preparable according to a recipe having one or more ingredients in common with a dish specified by a user, present a dish preparable according to a recipe having one or more preparation elements in common with a dish specified by a user, or to present a dish preparable according to a recipe having both one or more ingredients and one or more preparation elements in common with a recipe for a dish specified by a user.

Furthermore, the recipe presentation device is capable of presenting, in a manner that allows the user to see the dishes at a glance, a dish preparable according to a recipe having one or more ingredients in common with a recipe for a dish specified by a user and a dish preparable according to a recipe having one or more preparation elements in common with the recipe for the specified dish.

[Embodiment 2]

In Embodiment 2, a recipe presentation device presents a user with a dish having a high similarity to a dish specified by a user in ingredients, a dish having a high similarity to a dish specified by a user in preparation methods, and a dish having a high similarity to a dish specified by a user both in ingredients and in preparation methods, along with the similarities at a time.

Figure 11:
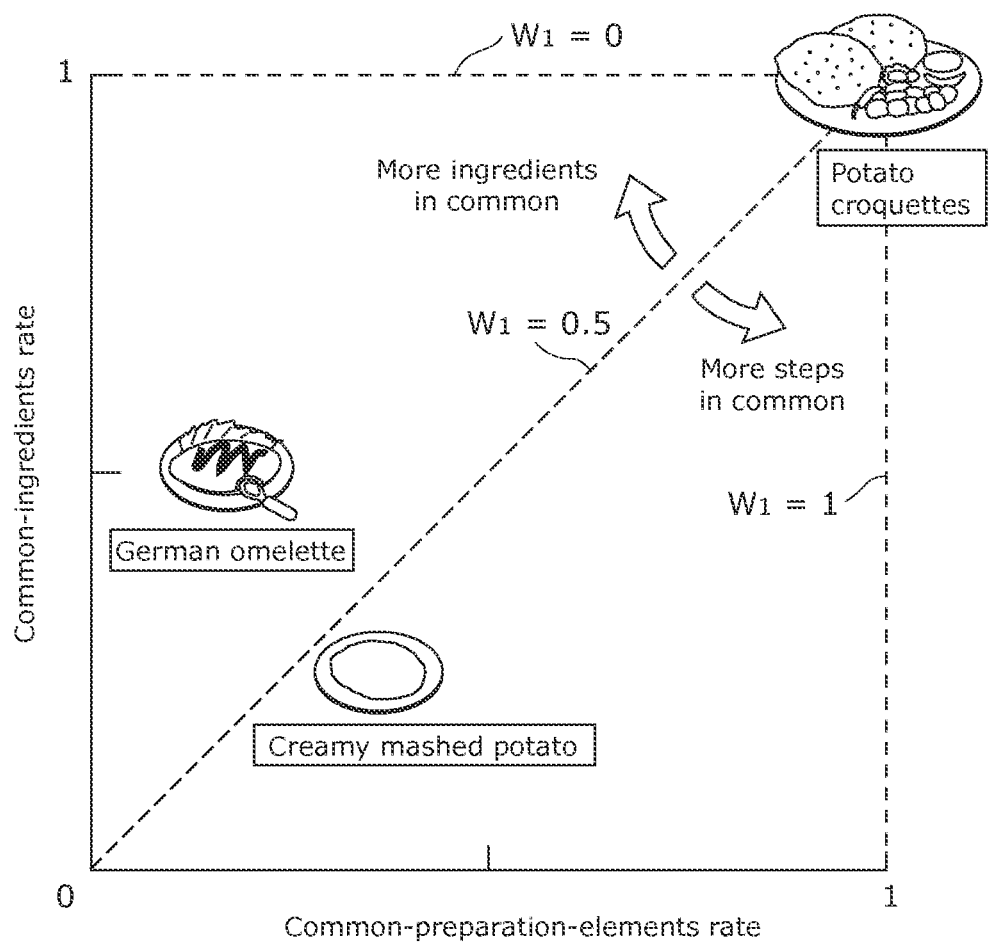
FIG. 11 shows an example of a dish similarity map to be presented by a recipe presentation device according to Embodiment 2.

FIG. 11 shows an example of a dish similarity map to be presented by a recipe presentation device according to Embodiment 2. A dish "German omelette" and a dish "creamy mashed potato" are each determined to have a higher similarity to a dish "potato croquettes" specified by a user, and they are presented together with the dish "potato croquettes" at a position corresponding to the similarities as shown in FIG. 11. This manner of presentation is also referred to as a dish similarity map. The dish similarity map will be described in detail below.

The recipe presentation device performs the following processing in addition to the processing in Embodiment 1 in order to generate the similarity map shown in FIG. 11. Here, the recipe B refers to a recipe for "potato croquettes". The other dishes refer to "German omelette" and "creamy mashed potato".

(1) A common-ingredients rate of the recipe B to a recipe for each of the other dishes is calculated using (Equation 2-1).

Common-ingredients rate=(total number of preparation elements of "Intermediate ingredient" having common values between the recipes for all the items of "Foodstuff", "Preparation", and "Preceding step ID")/(total number of the preparation elements of the recipe $B$) (Equation 2-1)

(2) A common-preparation-elements rate of the recipe B and a recipe for each of the other dishes is calculated using (Equation 2-2).

Common-preparation-elements rate=(total number of preparation elements of "Ingredient" having common values between the recipes for the item of "Foodstuff")/(total number of the preparation elements of the recipe $B$) (Equation 2-2)

(3) Plot a diagram of each dish at a position specified by coordinates which are the common-ingredients rate and the common-preparation-elements rate.

In the dish similarity map, a recipe for a dish other than the recipe B is closer to a line of common-preparation-elements rate=1 ($w_1=1$) when the recipe has more preparation elements in common with the recipe B. A recipe for a dish other than the recipe B is closer to a line of common-ingredients rate=1 ($w_1=0$) when the recipe has more ingredients in common with the recipe B. In the dish similarity map, a recipe for dish on the line of common-preparation-elements rate=common-ingredients rate ($w_1=0.5$) corresponds to a recipe for a dish having the highest similarity to the recipe B when $w_1=0.5$ in Embodiment 1.

This will be specifically described below with reference to FIG. 3A. The recipe for potato croquettes has six preparation elements one of which (b11) is in common with the recipe for German omelette. Therefore, the common-preparation-elements rate of the recipe for German omelette to the recipe for potato croquettes is 1/6. The recipe for potato croquettes has four ingredients two of which (b10 and b30) are in common with the recipe for German omelette. Therefore, the common-ingredients rate of the recipe for German omelette to the recipe for potato croquettes is 1/2. Thus, in the dish similarity map, a diagram of the German omelette is plotted at a position specified by coordinates of (common-preparation-elements rate, common-ingredients rate)=(1/6, 1/2). A diagram of creamy mashed potato is also plotted at a position determined in the same manner.

An ingredient similarity may be used instead of the common-ingredients rate, and a preparation element similarity may be used instead of the common-preparation-elements rate. In this case, the dish similarity map can be use in the same manner as described above with modification to the scale on the abscissa and the ordinate of the dish similarity map.

As described above, the recipe presentation device according to an aspect of the present invention presents a user with a dish having one or more ingredients in common with a dish specified by a user, a dish having one or more preparation elements in common with the dish specified by the user, and a dish having one or more ingredients and one or more preparation elements in common with the dish specified by the user along with the similarities between the dishes and the dish specified by the user, all of which are plotted on a similarity map. The user is thus allowed to select a dish to prepare in parallel with the dish specified by the user, from among the candidate dishes plotted on the similarity map. Thus, with reference to the dishes presented by the recipe presentation device, the user can learn a plurality of dishes preparable according to similar recipes without performing keyword search or comparing retrieved information.

The technique in the above-described aspects may be implemented in, for example, the following types of cloud services. It should be noted that these types of cloud services in which the technique in the above-described aspects are non-limiting examples.

(Service Type 1: Own Data Center Type)

Figure 13:
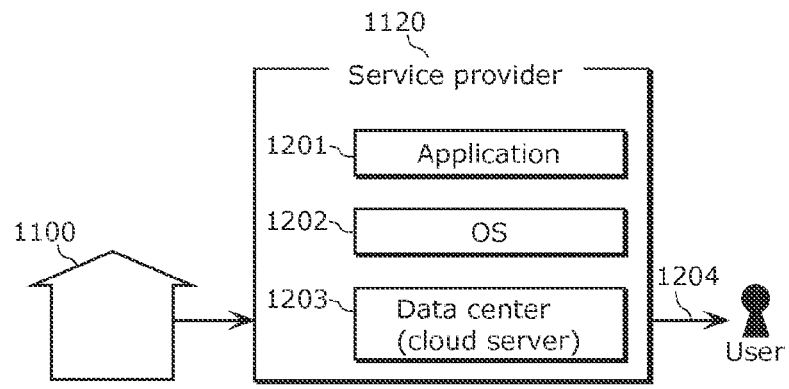
FIG. 13 illustrates a service type 1 for each of the embodiments.

FIG. 13 illustrates a service type 1 (own data center type). In this type, a service provider 1120 obtains information from a group 1100 and provides a service to users. The service provider 1120 in this type serves a function similar to the function of a data center operating company. In other words, the service provider owns a cloud server 1111 to manage big data. Thus, in this type, there is no actual data center operating company.

In this type, the service provider 1120 operates and manages a data center (cloud server 1111) (1203). Furthermore, the service provider 1120 manages OS (1202) and applications (1201). The service provider 1120 provides a service (1204) using the OS (1202) and applications (1201) managed by the service provider 1120 itself.

(Service Type 2: IaaS-Based Type)

Figure 14:
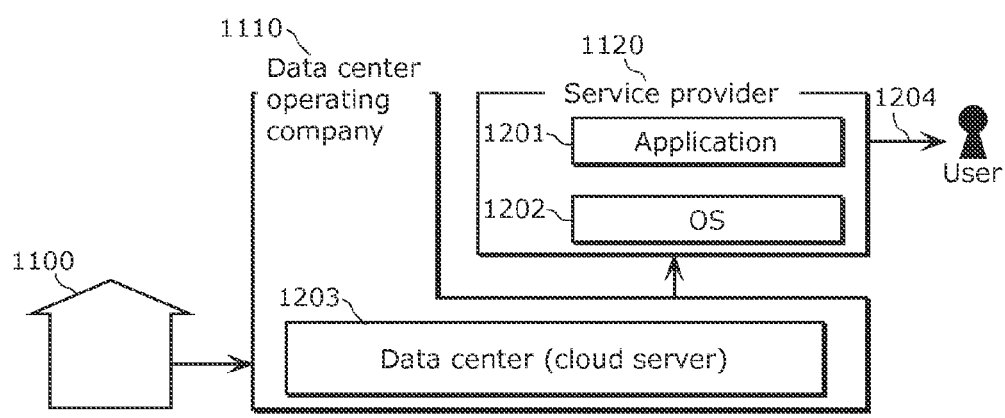
FIG. 14 illustrates a service type 2 for each of the embodiments.

FIG. 14 illustrates a service type 2 (Infrastructure as a Service (IaaS)-based type). The term IaaS is an acronym for Infrastructure as a Service which refers to a type of a cloud service in which infrastructure for building and running a computer system is provided as a service via the Internet.

In this type, a data center operating company operates and manages a data center (cloud server 1111) (1203). Furthermore, a service provider 1120 manages OS (1202) and applications (1201). The service provider 1120 provides a service (1204) using the OS (1202) and applications (1201) managed by the service provider 1120 itself.

(Service Type 3: PaaS-Based Type)

Figure 15:
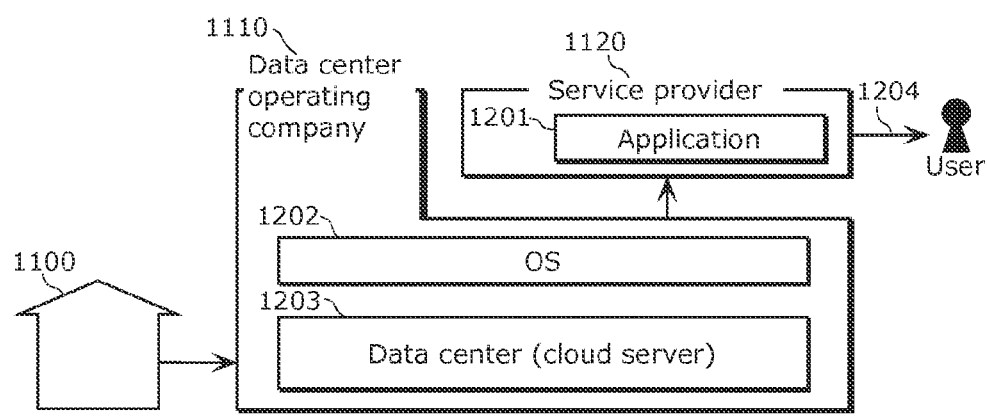
FIG. 15 illustrates a service type 3 for each of the embodiments.

FIG. 15 illustrates a service type 3 (Platform as a Service (PaaS)-based type). The term PaaS is an acronym for Platform as a Service which refers to a type of a cloud service in which a platform for composing and running software is provided as a service via the Internet.

In this type, a data center operating company 1110 manages OS (1202) and operates and manages a data center (cloud server 1111) (1203). Furthermore, a service provider 1120 manages applications (1201). The service provider 1120 provides a service (1204) using the OS (1202) managed by the data center operating company and the applications (1201) managed by the service provider 1120 itself.

(Service Type 4: SaaS-Based Type)

Figure 16:
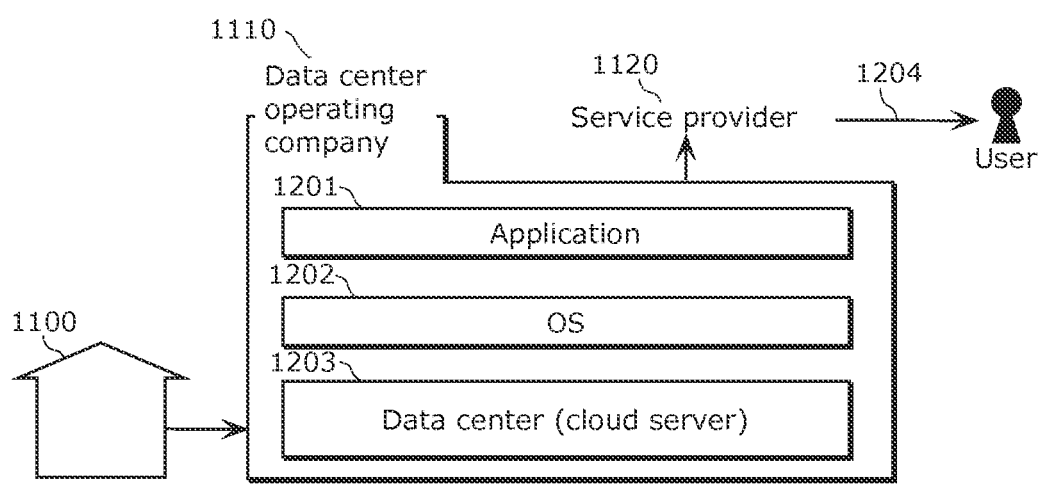
FIG. 16 illustrates a service type 4 for each of the embodiments.

FIG. 16 illustrates a service type 4 (Software as a Service (SaaS)-based type). The term SaaS is an acronym for Software as a Service. For example. SaaS refers to a type of cloud service in which a company or a person (user) not having a data center (cloud server) is provided access to an application via the Internet by a platform provider having a data center (cloud server).

In this type, a data center operating company 1110 manages applications and OS (1202) and operates and manages a data center (cloud server 1111) (1203). The service provider 1120 provides a service (1204) using the OS (1202) and applications (1201) managed by the data center operating company 1110.

In any of the above types, the service provider 1120 is considered as a provider of the service. For example, the service provider or the data center operating company may develop OS, applications, or big data database and others by itself or may outsource the development to a third party.

Each of the constituent elements in each of the above-described embodiments may be configured in the form of an exclusive hardware product, or may be realized by executing a software program suitable for the constituent element. The constituent elements may be implemented by a program execution unit such as a CPU or a processor which reads and executes a software program recorded on a recording medium such as a hard disk or a semiconductor memory. A software program in which the recipe presentation device according to each of the above embodiments is implemented is as follows.

More specifically, the program causes a computer to perform a recipe presentation method including: receiving input for specifying a dish from a user; searching for a first recipe including preparation elements of (i) ingredients which are materials for the dish received in the receiving, (ii) intermediate ingredients which are processed from the ingredients and to be further processed before completion of the dish, and (iii) a dish which indicates the dish received in the receiving as a dish to be served; calculating similarities between individual recipes for dishes and the first recipe retrieved in the searching; selecting, according to the similarities calculated in the calculating, a second recipe which is a recipe similar to the first recipe among the recipes for the dishes; and presenting a dish corresponding to the second recipe selected in the selecting.

A recipe presentation device according to one or more aspects has been thus described on the basis of the embodiments. Here, it should be noted that the present invention is not limited to the embodiments. Variations of the embodiments which would occur to those skilled in the art and embodiments in which the constituent elements in the present embodiment or the variations thereof, are also within the scope of the one or more aspects of the present invention.

INDUSTRIAL APPLICABILITY

The recipe presentation device according to the present invention is advantageously used as a recipe presentation device which automatically extracts a recipe highly similar to another recipe, and the recipe presentation device, and the recipe presentation method according to the present invention is advantageously used as a recipe presentation method of automatic extraction of a recipe highly similar to another recipe,

REFERENCE SIGNS LIST

100 Recipe presentation device
101 Receiving unit
102 Recipe storage unit
103 Search unit
104 Similarity calculation unit
105 Selection unit
106 Presentation unit
1100 Group
1110 Data center operating company
1111 Cloud server
1120 Service provider
1201 Application
1202 OS
1203 Data center
1204 Provision of service

The invention claimed is:

1. A recipe presentation device comprising:
a recipe storage unit storing recipes for dishes, the recipes each including preparation elements of (i) ingredients which are materials for a corresponding one of the dishes, (ii) intermediate ingredients which are processed from the ingredients and to be further processed before completion of the corresponding dish, each of the intermediate ingredients being identified by an ID for unique identification and having values respectively identifying an item of preparation, a process performed on the item of preparation, and a preceding preparation element, and (iii) a dish which indicates the corresponding dish as a dish to be served;
a receiving unit configured to receive input for specifying a dish from a user;
a search unit configured to search the recipe storage unit for a first recipe which is a recipe for the dish specified in the input received by the receiving unit;
a similarity calculation unit configured to calculate a similarity between each of the recipes for the dishes stored in the recipe storage unit and the first recipe retrieved by the search unit;
a selection unit configured to select, according to a plurality of the similarities calculated by the similarity calculation unit, a second recipe which is a recipe similar to the first recipe among the recipes for the dishes; and
a presentation unit configured to present a dish corresponding to the second recipe selected by the selection unit,
wherein the similarity calculation unit is configured to calculate the similarity between the first recipe and each of the recipes for the dishes by obtaining a weighted sum of an ingredient similarity and a process similarity, the ingredient similarity indicating a total number of common ingredients between the first recipe and the recipe for the dish, and the process similarity indicating a total number of common intermediate ingredients between the first recipe and the recipe for the dish.

2. The recipe presentation device according to claim 1,
wherein the search unit is configured to search the recipe storage unit for a first ingredient which is a set of ingredients for the dish specified in the input received by the receiving unit,
the similarity calculation unit is configured to calculate a similarity between a set of the ingredients included in each of the recipes stored in the recipe storage unit and the first ingredient retrieved by the search unit,
the selection unit is configured to select, according to a plurality of the similarities calculated by the similarity calculation unit, a second ingredient which is one or more ingredients in a plurality of the sets of the ingredients included in the individual recipes and also included in the first ingredient, and
the presentation unit is configured to present a dish corresponding to the second ingredient selected by the selection unit.

3. The recipe presentation device according to claim 1,
wherein the similarity calculation unit is configured to calculate the similarity between the first recipe and each of the recipes for the dishes by obtaining the weighted sum of the ingredient similarity and the process similarity using weightings which add up to 1 and each have a value not less than 0 and not greater than 1.

4. The recipe presentation device according to claim 1,
wherein the presentation unit is configured to present the dish corresponding to the second recipe selected by the selection unit, by displaying a name of the dish corresponding to the second recipe closer to a name of the dish corresponding to the first recipe when a similarity between the second recipe and the first recipe is higher.

5. The recipe presentation device according to claim 1,
wherein the presentation unit is configured to present the dish corresponding to the second recipe and the similarity between the second recipe and the first recipe using a dish similarity map which is a two-dimensional plane on which the dish corresponding to the first recipe and the dish corresponding to the second recipe plotted, the two-dimensional plane having an axis indicating the ingredient similarity and an axis indicating the process similarity.

6. A recipe presentation method comprising:
receiving input for specifying a dish from a user;
searching for a first recipe including preparation elements of (i) ingredients which are materials for the dish received in the receiving, (ii) intermediate ingredients which are processed from the ingredients and to be further processed before completion of the dish, each of the intermediate ingredients being identified by an ID for unique identification and having values respectively identifying an item of preparation, a process performed on the item of preparation, and a preceding preparation element, and (iii) a dish which indicates the dish received in the receiving as a dish to be served;
calculating similarities between individual recipes for dishes and the first recipe retrieved in the searching;
selecting, according to the similarities calculated in the calculating, a second recipe which is a recipe similar to the first recipe among the recipes for the dishes; and
presenting a dish corresponding to the second recipe selected in the selecting,
wherein the calculating includes calculating the similarity between the first recipe and each of the recipes for the dishes by obtaining a weighted sum of an ingredient similarity and a process similarity, the ingredient similarity indicating a total number of common ingredients between the first recipe and the recipe for the dish, and the process similarity indicating a total number of common intermediate ingredients between the first recipe and the recipe for the dish.

7. A non-transitory computer-readable recording medium for use in a computer, the recording medium having a computer program recorded thereon for causing the computer to perform the recipe presentation method according to claim 6.

8. An integrated circuit comprising:
a receiving unit configured to receive input for specifying a dish from a user;
a search unit configured to search for a first recipe which indicates a recipe including preparation elements of (i) ingredients for the dish specified in the input received by the receiving unit, (ii) intermediate ingredients which are processed from the ingredients and to be further processed before completion of the dish, each of the intermediate ingredients being identified by an ID for unique identification and having values respectively identifying an item of preparation, a process performed on the item of preparation, and a preceding preparation element, and (iii) a dish which indicates the dish as a dish to be served;
a similarity calculation unit configured to calculate similarities between individual recipes for dishes and the first recipe retrieved by the search unit;
a selection unit configured to select, according to the similarities calculated by the similarity calculation unit, a second recipe which is a recipe similar to the first recipe among the recipes for the dishes; and
a presentation unit configured to present a dish corresponding to the second recipe selected by the selection unit,
wherein the similarity calculation unit is configured to calculate the similarity between the first recipe and each of the recipes for the dishes by obtaining a weighted sum of an ingredient similarity and a process similarity, the ingredient similarity indicating a total number of common ingredients between the first recipe and the recipe for the dish, and the process similarity indicating a total number of common intermediate ingredients between the first recipe and the recipe for the dish.

* * * * *